US006983271B2

(12) United States Patent
Morrow et al.

(10) Patent No.: US 6,983,271 B2
(45) Date of Patent: Jan. 3, 2006

(54) ANSWER WIZARD DROP-DOWN CONTROL

(75) Inventors: Catherine Rose Morrow, Seattle, WA (US); Glenn L. Frankel, Seattle, WA (US); Christopher C. White, Seattle, WA (US); Zeke Koch, Seattle, WA (US); Richard M. Banks, Kirkland, WA (US); Tjeerd Hoek, Kirkland, WA (US); Aaron H. Weiss, Tucson, AZ (US)

(73) Assignee: Microsoft Corporation, Redmond, WA (US)

( * ) Notice: Subject to any disclaimer, the term of this patent is extended or adjusted under 35 U.S.C. 154(b) by 262 days.

(21) Appl. No.: 09/880,424

(22) Filed: Jun. 13, 2001

(65) Prior Publication Data

US 2002/0194164 A1 Dec. 19, 2002

(51) Int. Cl.
*G06F 17/30* (2006.01)
(52) U.S. Cl. .................................. 707/3; 707/4; 707/5
(58) Field of Classification Search ....... 707/1–10,101, 707/100
See application file for complete search history.

(56) References Cited

U.S. PATENT DOCUMENTS

| 5,995,921 | A | * | 11/1999 | Richards et al. ................ 707/3 |
| 6,144,958 | A | * | 11/2000 | Ortega et al. .................... 707/5 |
| 6,618,722 | B1 | * | 9/2003 | Johnson et al. ................. 707/5 |
| 6,647,389 | B1 | * | 11/2003 | Fitch et al. ..................... 707/10 |
| 6,654,754 | B1 | * | 11/2003 | Knauft et al. ................ 707/100 |

OTHER PUBLICATIONS

*Engineering User Models to Enhance Multi-Modal Dialogue*; H. R. Chappel, M. D. Wilson and b. Cahour*IFIP Transactions A (Computer Science and Technology)* vol. A-18; 1992; pp. 297-315.
*An Assessment of Written Interactive Dialogue for Information Retrieval Applications*; H. Brunner, G. Whittemore, K. Ferrara and J. Hsu; *Human-Computer Interactions* vol. 7, no. 2; 1992; pp. 197-249.

(Continued)

*Primary Examiner*—Frantz Coby
*Assistant Examiner*—Marc R. Filipczyk
(74) *Attorney, Agent, or Firm*—Merchant & Gould

(57) ABSTRACT

An answer wizard drop-down menu for providing users quick and efficient access to help utilities, including help files and wizards provided by a software application, is provided. An answer wizard drop-down edit control and interface is located in a conspicuous, but non-obstructive location on a software application graphical interface. An edit control allows a user to enter a question regarding some desired functionality of the application. In response to the user's question, the user is presented with a list of potential answers to the question in a drop-down menu. If the user finds an acceptable answer to her question in the list of potential answers, the user selects the acceptable answer, and an appropriate help file application is launched to provide the user assistance with the functionality about which the user has questions. Each question so asked by the user is saved in a list of most recently used items. The next time the user needs assistance, the user may open the list of most recently used items to obtain a list of the most recent questions previously asked by the user. The user may then, if desired, select one of the previously asked questions and initiate another search on the selected question to obtain the list of potential answers. The user may then select a new or previously viewed answer to return to the help file application.

10 Claims, 6 Drawing Sheets

OTHER PUBLICATIONS

*The Design of an Interactive Online Help Desk in the Alexandria Digital Library*; Robert Prince, Jianwen Su, Hong Tang and Yonggang Zhao; *Proceedings of the International Joint Conference on Work Activities Coordination and Collaboration*; 1999; pp. 217-226.

*What Help Do Users Need?: Taxonomies for On-Line Information Needs Access Methods*; A. W. Roesler and S. G. McLellan; *Conference Proceedings on Human Factors in Computing Systems*; 1995; pp. 437-441.

* cited by examiner

ANSWER WIZARD DROP-DOWN CONTROL

TECHNICAL FIELD

The present invention generally relates to an interactive help utility. More particularly, the present invention relates to a method for efficiently interacting with the help utility functionality.

BACKGROUND OF THE INVENTION

Since the advent of computers, a large and growing number of computer software applications have been developed to assist users in all aspects of business, education, entertainment and personal development. As an ever-increasing number of software applications are developed, the amount of and complexity of functionality provided to users by those software applications have increased dramatically.

Often users become bogged down in the complexity and quantity of functionality offered by their software applications. They often have difficulty locating the desired functionality; when they are able to locate desired functionality, often they do not understand how to use the functionality to its fullest benefit. Many computer software applications contain help files and so called "wizards." Wizards are interactive help utilities within applications or operating systems that may be used to guide the user through steps of particular tasks such as opening a document, printing a document, saving a document, and the like. It is known in the prior art to include help files in software applications for providing information to the user about a particular component or functionality of a software application. It is also known in the art to provide a wizard for guiding a user through the steps of the task at hand, for example, printing a document. However, the user typically must launch the help file functionality in order to receive assistance from the help files. And, unfortunately, the user may be just as unfamiliar with the steps required to launch the help file functionality as he/she is with executing the task at hand.

Some prior art systems include a wizard that deploys as a graphical user interface on the screen of the user's computer. The user may select the wizard in order to get assistance with performing the desired functionality.

It is with respect to these considerations and others that the present invention has been made.

SUMMARY OF THE INVENTION

In accordance with the present invention, the above and other problems are solved by a method and system for providing an answer wizard edit/drop-down control and interface that is located in a conspicuous, but non-obstructive location on a software application graphical interface and allows a user to enter a question or search string regarding some desired functionality of the application. Preferably, the answer wizard edit/drop-down control and interface are located in the toolbar of a software application.

In response to a question or search string received via the edit control, a list of potential answers is displayed in a drop-down menu. If the user finds an acceptable answer to the question or search string in the list of potential answers, he/she may select the acceptable answer, and the appropriate help file application will be launched to provide assistance with the functionality at which the question or search string is directed.

Each question or search string entered is saved in a list of most recently used items. The next time assistance is needed, the user may open the list of most recently used items to obtain a list of the questions previously asked. The user may then select one of the previously asked questions and rerun the query for a list of potential answers to the selected question. The user may then select the same help file application and assistance obtained by the user the last time the user had that particular question, or the user may select a different answer and associated help file application and assistance.

These methods may be implemented as a computer process, a computing system or as an article of manufacture such as a computer program product or computer readable media. The computer program product may be a computer storage medium readable by a computer system and encoding a computer program of instructions for executing a computer process. The computer program product may also be a propagated signal on a carrier readable by a computing system and encoding a computer program of instructions for executing a computer process.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention, as claimed.

DETAILED DESCRIPTION OF THE PREFERRED EMBODIMENT

An exemplary embodiment of the present invention includes an answer wizard drop-down control that provides users with quick and efficient access to help utilities, including help files and wizards provided by a software application. An answer wizard drop-down control and interface is located in a conspicuous, but non-obstructive location on a software application graphical interface. An edit control allows a user to enter a question regarding desired functionality of the application. In response to the question, a list of potential answers is presented in a balloon to the user.

If the user finds an acceptable answer to his/her question in the list of potential answers, the user can select the acceptable answer, and a help application, loaded with the help file appropriate to the user's question, will be launched.

Each question so asked by the user is saved in a list of most recently asked questions. Accordingly, the next time the user needs assistance, the user may open this list to view the questions he/she has most recently asked. The user may then, if desired, select one of the previously asked questions and rerun the query for a list of potential answers to the selected question. The user may then select the same answer as he/she previously selected in order to obtain the same assistance as he/she previously sought when asking that particular question, or the user may select a different answer, thereby launching the help application with a different help file loaded, providing the user with a different answer than he/she was previously provided.

Figure 1:
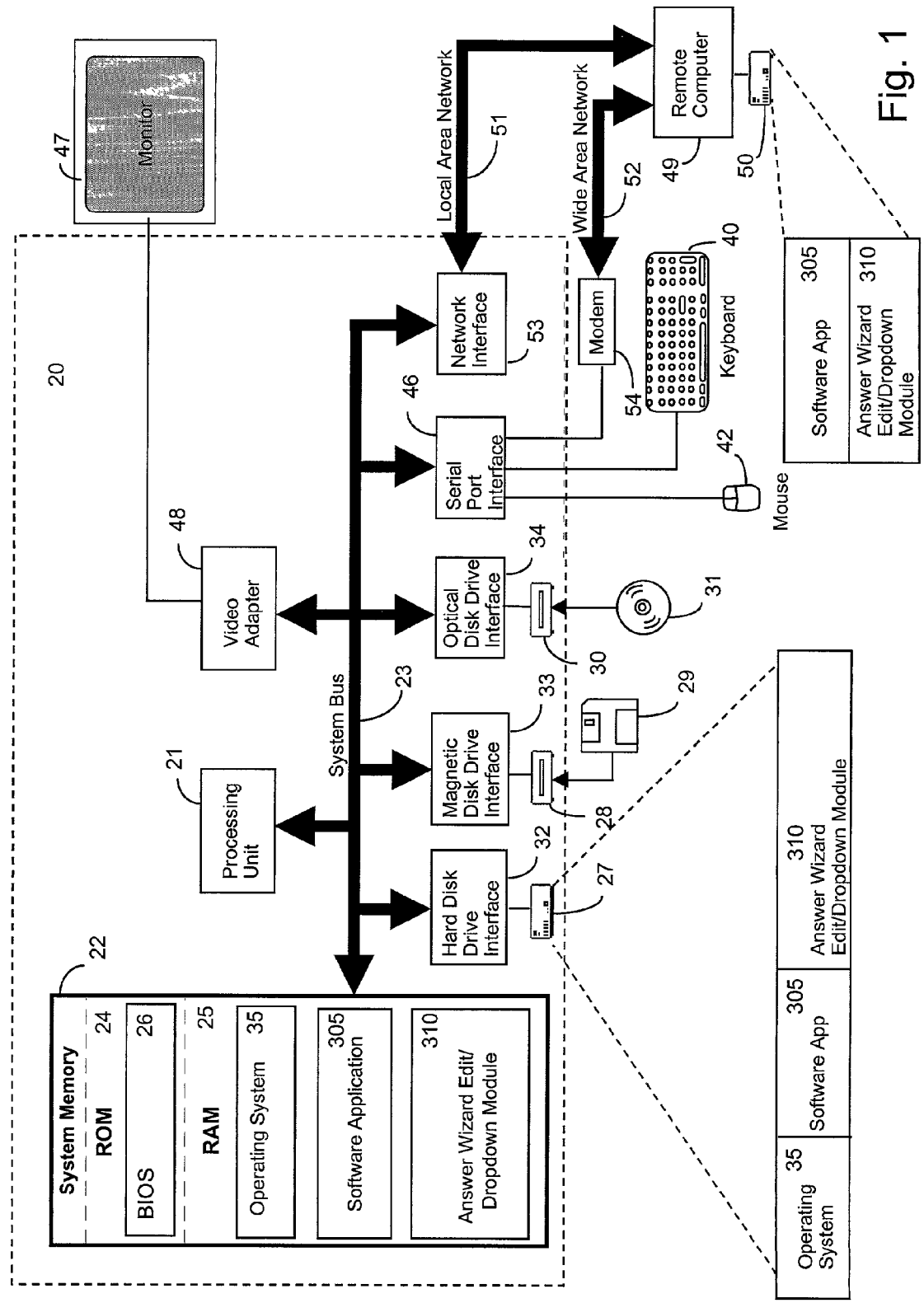
FIG. 1 illustrates a computer system that provides an operating environment for an exemplary embodiment of the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24.

The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, a software application 305, and an answer wizard edit/drop-down control module 310. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers 49. The remote computer 49 may be a server, a router, a peer device or other common network node, and typically includes many or all of the elements described relative to the personal computer 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

A computing device, such as personal computer 20, typically includes at least some form of computer readable media. Computer readable media can be any available media that can be accessed by personal computer 20. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by personal computer 20.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. Computer readable media may also be referred to as computer program product.

Figure 2:
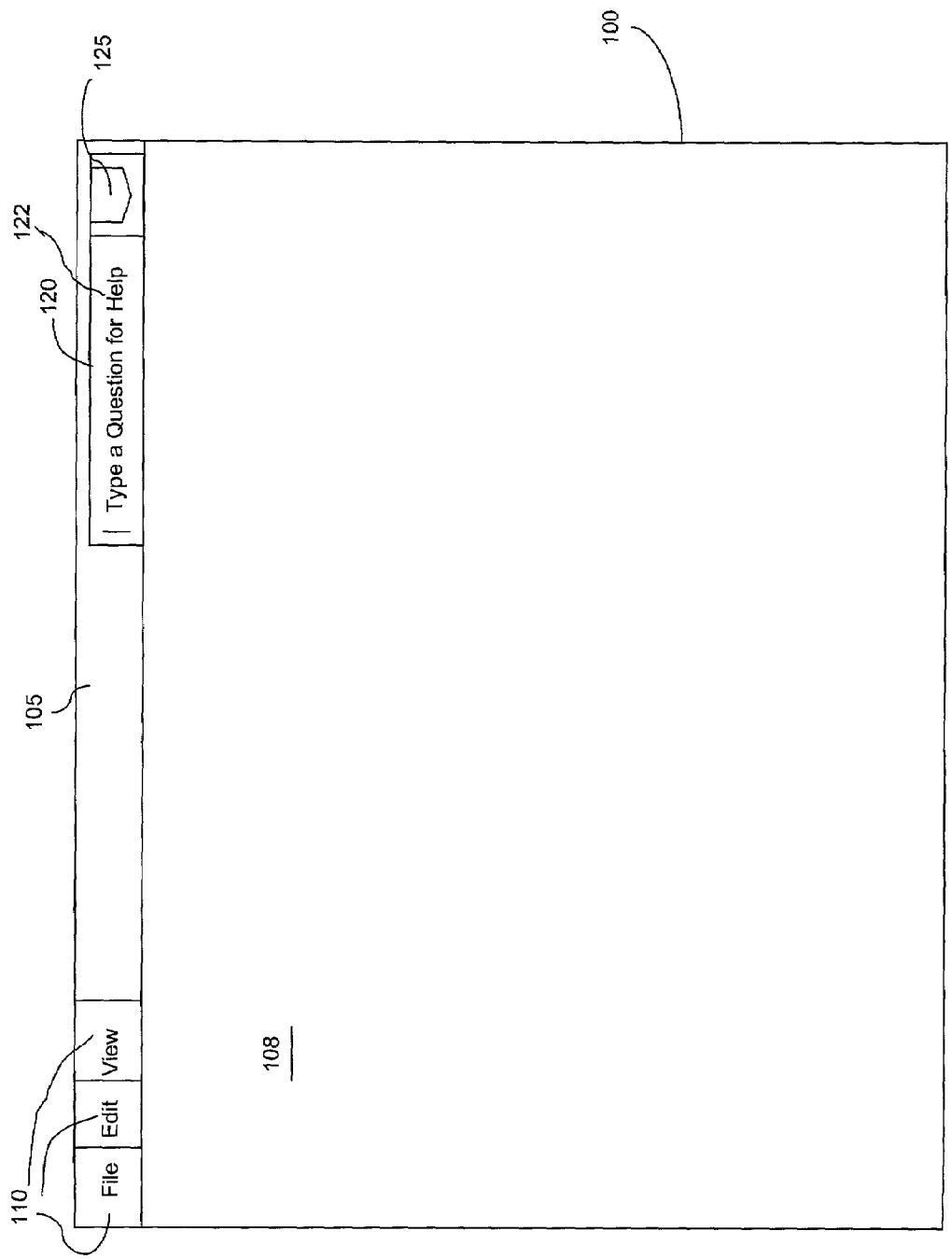
FIG. 2 illustrates an exemplary screen display of a computer generated user interface window showing the functionality of the present invention.

Referring now to FIG. 2, an exemplary graphical user interface window 100 is illustrated. The window 100 includes an exemplary text or data input area 108 and a main toolbar 105. Situated in the main toolbar 105 are exemplary software functionality buttons 110, such as File, Edit and View buttons. As is well known to those skilled in the art, the graphical user interface window 100, illustrated in FIG. 1, is representative of a typical text input window of a word processing application. An exemplary word processing application includes Word manufactured by Microsoft Corporation of Redmond, Wash.

In a typical graphical user interface window, such as the window 100 illustrated in FIG. 1, functionality of the software application presenting the window 100 is provided by selecting various icons and buttons. For example, in accordance with an exemplary word processing application, selection of the File button 110 may open a drop-down menu (not shown) under which a user of the software application may find additional functionality include File Open, File Close, File Save, File Print, etc.

In accordance with an exemplary embodiment of the present invention, an edit control 120, hereafter referred to as "control 120", is provided in the toolbar 105 of the window 100. It should be understood that the toolbar 105 includes any area located on a data or text input and editing window where users are provided buttons and controls for utilizing the functionality of a software application for operation on or related to data or text entered, edited, or manipulated by the user. Preferably, placement of the control 120 in the toolbar 105 makes the functionality of the present invention readily and quickly accessible to the user because the user does not have to search for the control or be prompted to its use by a separate help utility. The control 120 includes a search string text entry area 122 and a drop-down button 125. Preferably, the control 120 is used to enter a search string or question, hereafter referred to as a "question," to request assistance from the help files associated with the software application 305 with which the user is working.

Figure 3:
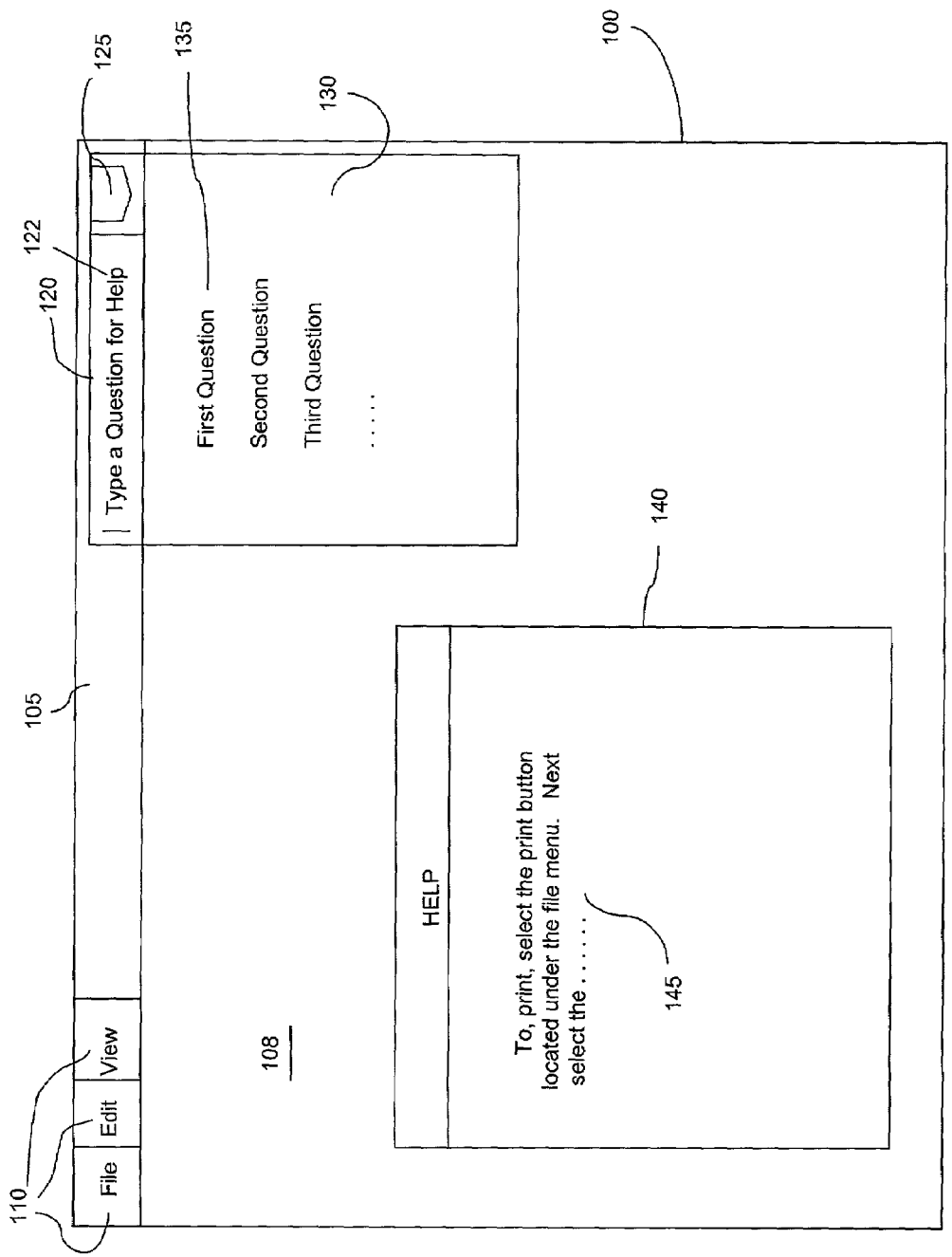
FIG. 3 illustrates an exemplary screen display of a computer generated user interface window showing the functionality of the present invention.

FIG. 3 illustrates the graphical user interface window 100 showing a drop-down menu 130 immediately underneath the control 120. In accordance with an exemplary embodiment, the drop-down menu 130 will contain a list of questions most recently asked by the user any time the user triggers the drop-down menu. As is well known to those skilled in the art, the drop-down menu 130 may be triggered in a number of ways, including, clicking on the drop-down button 125, keyboard action, or other action including focusing the mouse over the drop-down button 125. As described below, the drop-down menu 130 may be populated with a list of answers to questions asked by the user through the control 120 regarding the functionality of the software application with which the user is not familiar. A list of exemplary answers to a question asked by the user in the control 120 is illustrated in the drop-down menu 130.

A help window 140 with help text 145 is illustrated in the exemplary text entry area 108. As briefly described above, the help window 140 is displayed to the user in response to selection of one of the answers presented in the drop-down menu 130 in response to the question entered into the control 120 by the user in accordance with the present invention. For example, say the user is using an exemplary word processing application for entry and edit of a letter. If the user decides to print the letter but realizes that he/she is unfamiliar with the print functionality of the word processing software application, the user may enter a question in the text area 122 of the control 120. For example, the question might be, "How do I print?". After entry of the desired question, the user hits the "Enter" button of his/her keyboard to obtain answers to his/her question. In response to the user's question, one or more short answers are provided in balloon form to the user, as illustrated in the drop-down menu 130 illustrated in FIG. 3.

If the user finds an acceptable answer provided in the drop-down menu 130, the user may select the answer in a way well-known to those skilled in the art. For example, the user may click on the selected answer, or the user may use the arrow keys on her keyboard to focus on the desired answer and then hit "Enter." In accordance with an exemplary embodiment of the present invention, upon selection of an acceptable answer, functionality of the software application 305 in use by the user causes the help window 140 with help text 145 to be displayed, as illustrated in FIG. 3. The text 145 displayed in the help file window 140 provides the user with a detailed response to the user's question. For example, the text 145 might instruct the user, "To print, select the print button located under the File menu."

Figure 4:
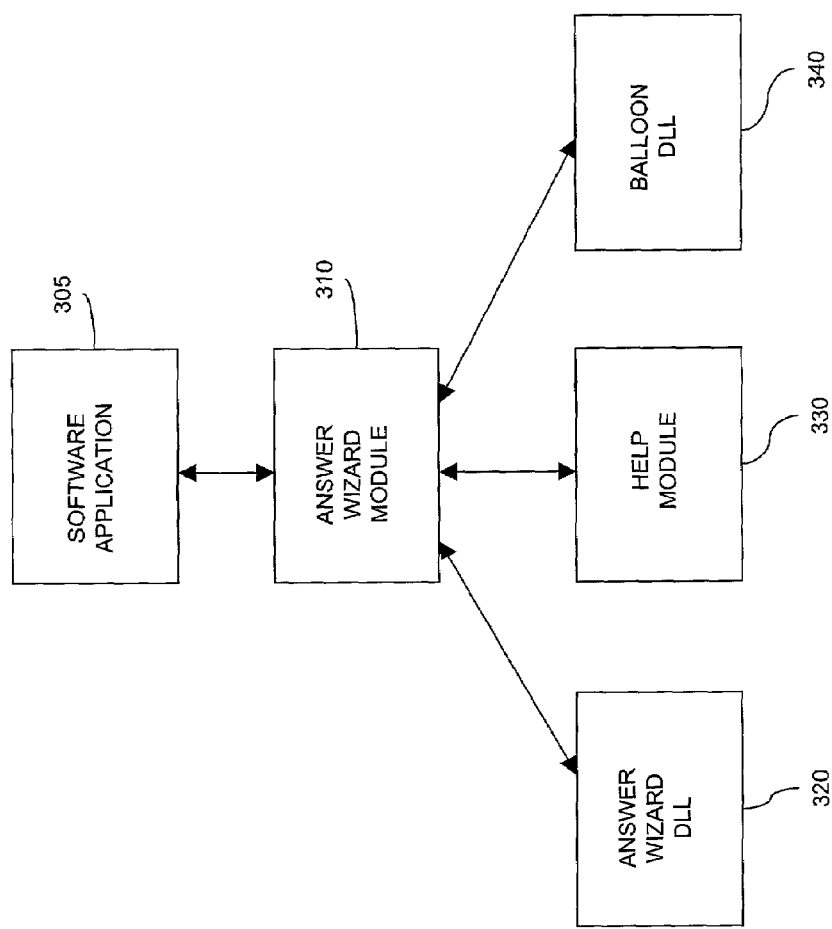
FIG. 4 illustrates interaction between a software application and an answer wizard edit/drop-down control module of an exemplary embodiment of the present invention.

FIG. 4 illustrates interaction between a software application 305 and an answer wizard edit/drop-down control module 310 (hereafter "edit/drop-down control module 310") of an exemplary embodiment of the present invention. In accordance with an exemplary embodiment, the edit/drop-down control module 310 is a software module that provides the above described answer wizard drop-down functionality to a software application 305, such as a word processing application. According to an exemplary embodiment of the present invention, three software modules including the answer wizard dynamic link library (DLL) 320, the help file module 330 and the balloon DLL 340 are utilized by the edit/drop-down control module 310 for providing the functionality of the answer wizard drop-down menu described above. The answer wizard DLL 320 is a software module comprised of executable routines that is preferably stored separately from the software application 305 and edit/drop-down control module 310. The functionality of the answer wizard DLL may be called by the software application 305 and/or the edit/drop-down control module 310, as necessary.

In accordance with an exemplary embodiment of the present invention, the answer wizard DLL 320 performs a search of available help topics contained in the help module 330 based on the question entered by the user in the control 120, illustrated in FIGS. 1 and 2. The methodology of the search performed by the answer wizard DLL 320 is well known to those skilled in the art and includes a search on certain recognized keywords in the question entered by the user. For example, if the user enters the string "How do I print?," the answer wizard DLL 320 parses the question to find recognized keywords with which to search the help topics contained in the help module 330. For example, the answer wizard DLL 320 may parse the question, "How do I print?," to yield the keyword "print," with which the answer wizard DLL searches the help topics provided in the help module 330. When the answer wizard DLL locates help topics in the help module related to the keyword "print," it returns to the edit/drop-down control module 310 a series of potential answers related to the keyword "print."

As is understood by those skilled in the art, the potential answers provided by the answer wizard DLL 320 to the edit/drop-down control module 310 for presentation to the user in the drop-down menu 130 may be provided in a hierarchical structure based on the keywords parsed by the answer wizard DLL 320. For example, the word "print" may yield topics related to print functionality before it yields topics related to printers because the string provided by the user contains the word "print," as opposed to the word "printer." If instead the user enters the question, "How do I print and save?," into the search and edit control 120, the answer wizard DLL 320 may parse the string to yield the keywords "print" and "save," to be used for searching help topics provided by the help module 330.

The help module 330 is a software application or module available for use by the software application 305 and/or the edit/drop-down control module 310 either as a resident software module or as a DLL. According to an exemplary embodiment of the present invention, the help module 330 accesses a collection of files written in hypertext markup language (HTML) containing information helpful to users on a variety of topics. When the answer wizard DLL 320 parses the question entered by the user to provide the user with a list of answers, the answer wizard DLL in concert with the edit/drop-down control module 310 and the help module 330 establishes a path from each of the potential answers to a related help topic provided by the help module 330. When the user of the edit/drop-down control module 310 selects a desired answer, as described above, the edit/drop-down control module 310 launches the functionality of the help module 330 to provide the help window 140, illustrated in FIGS. 1 and 2. The text 145 displayed in the help window 140 is the text contained in the file that the help module 330 selected as related to the answer, chosen by the user.

The balloon DLL 340 is a collection of executable routines utilized by the edit/drop-down control module 310 for displaying the drop-down menu 130 and the list of the potential answers. Operation of the balloon DLL 340 is well-known to those skilled in the art.

Figure 5:
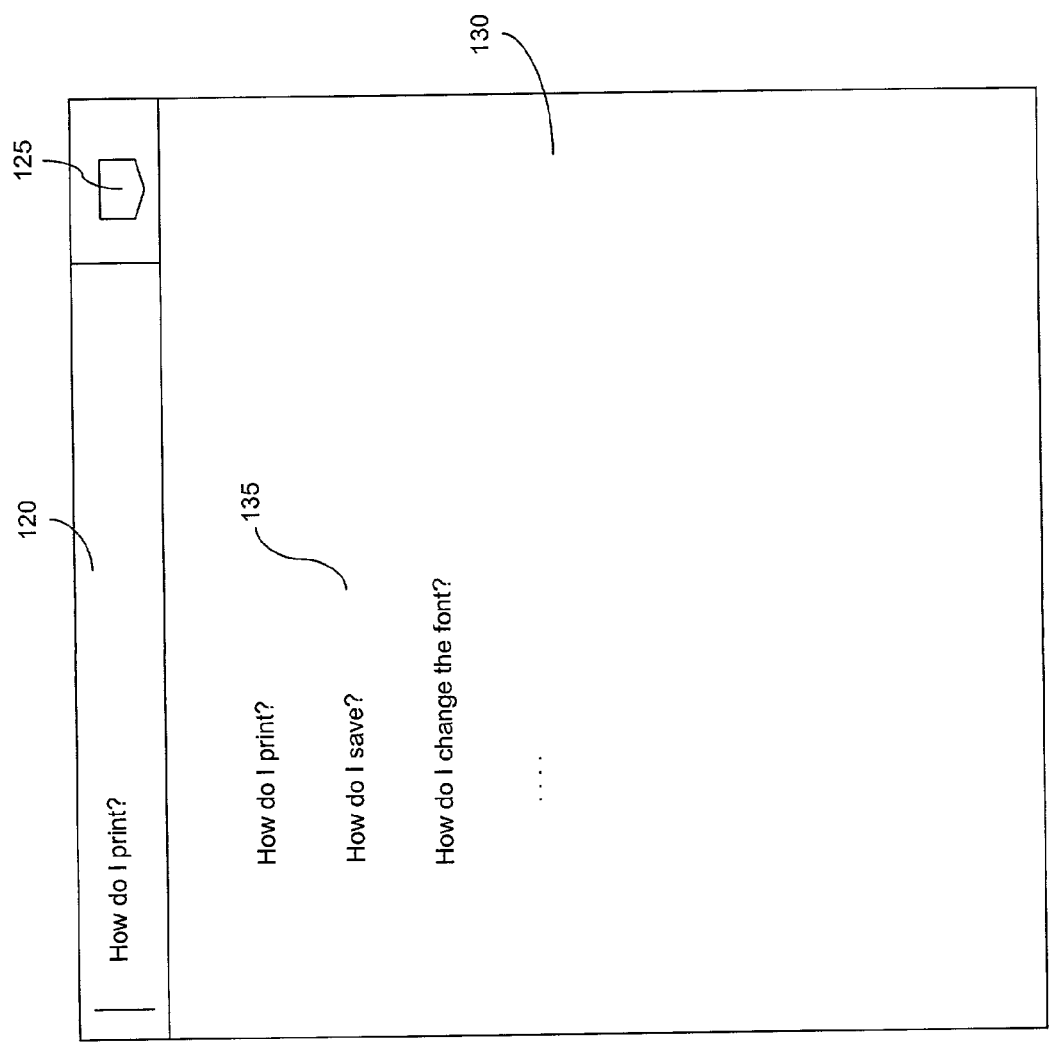
FIG. 5 illustrates a screen display of a computer generated user interface window showing an exemplary answer wizard drop-down menu of the present invention.

According to an exemplary embodiment of the present invention, the user may go back to previous questions to obtain help topics related to those questions without reentering the questions. FIG. 5 illustrates a screen display of a computer-generated user interface window showing an exemplary answer wizard drop-down menu 130 of the present invention. Each time the user enters a question into the control 120, that question or search string is saved in a list of most recently used items. Subsequently, the user may select the drop-down button 125, and the edit/drop-down control module 310 will provide the user with a list of previously asked questions or previously entered strings 137 in the drop-down menu 130, as illustrated in FIG. 5.

When the user does type in a new query in the edit control, the edit/drop-down control module 310 may then invoke the list of previously entered strings to find one that is similar to the user's new query. That is, if the user types, "How do I print?," the edit/drop-down control module 310 may provide previously-asked questions related to that question prior to providing a new answer to the question. If the user previously entered "How do I print?" and received an acceptable answer, but now the user enters "I want to print," the edit/drop-down control module may show the user that she has already entered "How do I print?" If the user desires to go back to the same help topics provided in response to the previous question, the user may select the previous question to get the same answers and potential help topics she received before. It should be understood by those skilled in the art, that if the number of previously asked questions or previously entered search strings exceeds the space allotted for the drop-down menu 130, the user may scroll through the provided list in order to see all items in the list. According to one embodiment, a limited number of previously asked questions or search strings is stored, and once that limit is reached, the oldest items are dropped from the list as needed to provide storage space for newer items.

If the user determines that one of the previously asked questions is the appropriate question for the user's present inquiry, the user may select one of the questions, and the edit/drop-down control module 310 performs a search, as described above, for help topics related to the selected question. Potential answers to the selected question are provided to the user, as described above.

Figure 6:
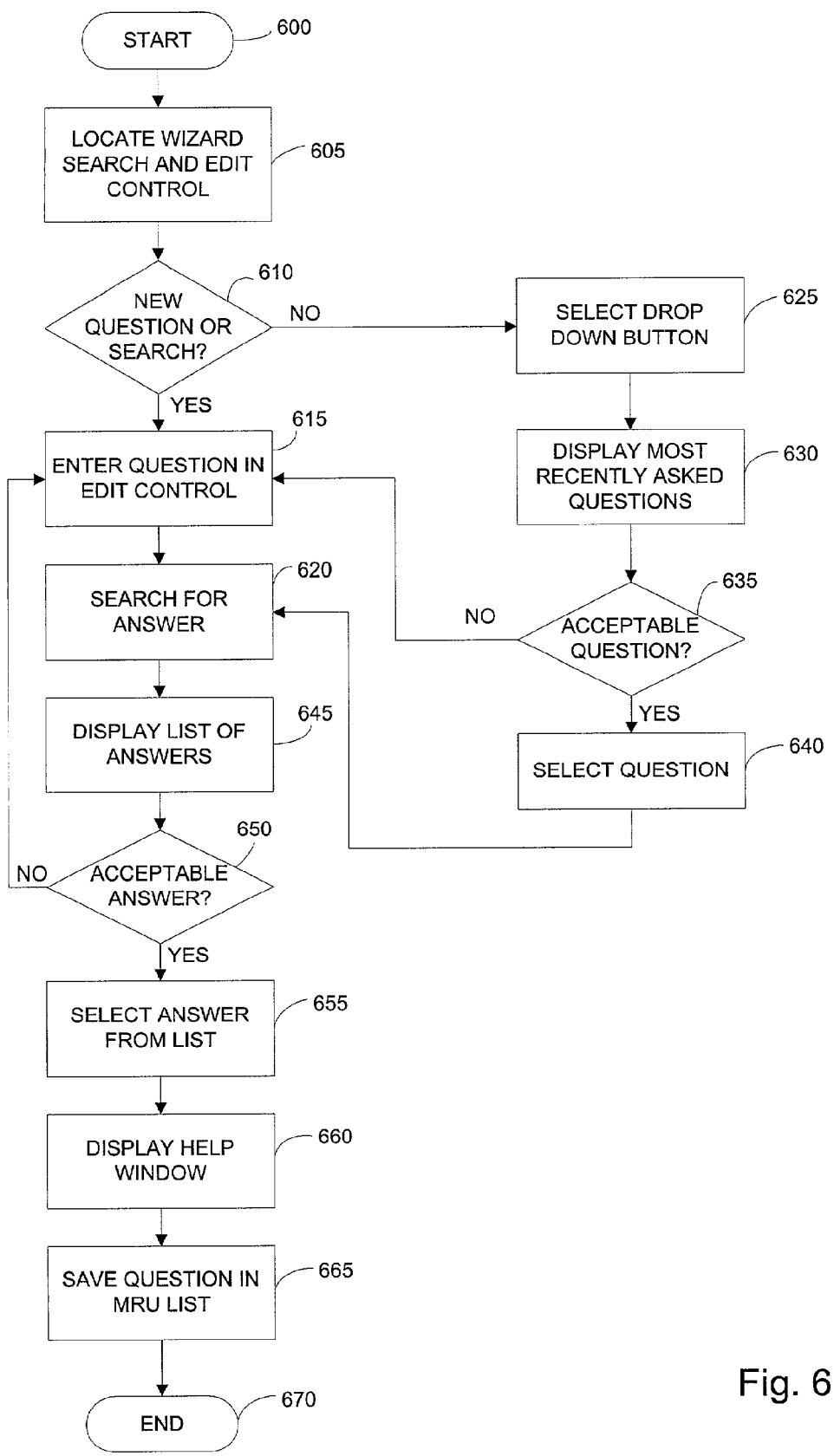
FIG. 6 illustrates an operational flow of the steps performed by the system and method of the present invention in providing assistance to a user of the answer wizard drop-down module of the present invention.

It is advantageous to describe the functionality of an exemplary embodiment of the present invention with reference to an exemplary operation during which a user seeks help with the save functionality of a word processing software application 305. FIG. 6 is an illustration of an operational flow of the steps performed by the system and method of the present invention in providing assistance to a user of the answer wizard drop-down module of the present invention. The operational flow described with reference to FIG. 6 also will be described with reference to FIGS. 1–5.

The operational flow begins at step 600 and proceeds to step 605. At step 605, the user of the word processing software application 305 decides to save her document and is unfamiliar with the save functionality of the word processing application. At step 605 the user locates the search and edit control 120 of the graphical user interface window 100 of the user's word processing application 305.

At step 610, a determination is made whether the user has a new question, or whether the user desires to select from previously asked questions. If at step 610, the user desires to enter a new question, the method proceeds along the "Yes" branch to step 615, and the user enters the question into the control 120. According to the present example, the user may enter a question such as, "How do I save my document?"

At step 620, the edit/drop-down control module 310 passes the question entered by the user to the answer wizard DLL 320. The answer wizard DLL 320 parses the question entered by the user and queries the help module 320 for related topics. At step 645, once the answer wizard DLL locates related topics provided by the help module, the answer wizard DLL passes the related help topics to the edit/drop-down control module 310 which presents the help topics in the form of potential answers to the user's question in the drop-down menu 130, as illustrated in FIG. 3. As described above, the potential answers are presented in balloon form by the functionality of the balloon DLL 340.

At step 650, the user reads the list of potential answers provided by the edit/drop-down control module 310 and the balloon DLL 340 and determines whether she believes any of the potential answers to be acceptable. If at step 650, the user does not find any of the potential answers acceptable, the method proceeds along the "No" branch back to step 615, where the user may enter a new question, or where the user may modify the previously-entered question. If at step 650 the user finds an acceptable answer in the list of answers provided by the edit/drop-down control module 310, the method proceeds to step 655, and the user selects an acceptable answer from the list.

At step 660, upon selection of the acceptable answer, the help module 330 is invoked by the edit/drop-down control module 310, and the help window 140 with text 145 is presented to the user, as illustrated in FIG. 3. For example, the text 145 presented to the user may read, "In order to save your document, select the save button under the File menu."

At step 665, the question entered by the user at step 615 is saved in a list of most recently used items for subsequent selection by the user. At step 670, the method ends.

Referring back to step 610, if the user believes that her present inquiry is similar to or is the same as a previous question entered by the user, the method proceeds to step 625, and the user selects the drop-down button 125 on the control 120. After the user selects the drop-down button 125, the method proceeds to step 630 and a list of previously asked questions is displayed in the drop-down menu 130, as illustrated in FIG. 5.

At step 635, the user reads the list of previously asked questions to determine whether one of the questions or search strings is acceptable for the present inquiry. If the user finds an acceptable question, the method proceeds along the "Yes" branch to step 640, and the user selects the acceptable question. The method then proceeds to step 620 for a search of help topics based on the selected question, as described above.

However, if at step 635 the user does not find an acceptable question in the list of previously asked questions, the method proceeds along the "No" branch to step 615 where the user may enter a new question. The method then proceeds to step 620, and a search is performed on the new question entered by the user, as described above.

It will be apparent to those skilled in the art that various modifications or variations can be made in the present invention without departing from the scope or spirit of the invention. Other embodiments of the invention will be apparent to those skilled in the art when considering the specification and the practice of the invention disclosed herein. It is intended that this specification be considered as exemplary only, where the true scope and the spirit of the invention are indicated by the following claims.

We claim:

1. A method for providing computer software help utility, comprising the steps of:
    providing a text entry area on a tool bar of a software application data entry and editing window;
    receiving a search string at the text entry area;
    searching a database for answers responsive to the search string;
    displaying a list of potential answers responsive to the search string;
    selecting, in response to a user input, one of the potential answers responsive to the search string;
    displaying a help text responsive to selecting one of the potential answers;
    after receiving the search strings at the text entry area, storing the search string in a list of most recently used search strings; and
    determining if the received search string is related to a search string stored in the list of most recently used search strings; and
    if the received search string is related to a search string stored in the list of most recently used search strings, then:
        retrieving the list of most recently used search strings; and
        displaying the list of most recently used search strings.

2. The method of claim 1, after the step of displaying a list of potential answers responsive to the search string, further including the steps of:
    allowing the user to determine whether an acceptable answer is provided in the list of potential answers;
    if an acceptable answer is not provided in the list of potential answers, allowing the user to refine the search string; and
    searching the database for more answers responsive to the refined search string;
    displaying a second list of potential answers responsive to the refined search string; and
    wherein the step of selecting one of the potential answers responsive to the search string includes selecting one of the potential answers from the second list of potential answers.

3. The method of claim 1, further comprising the steps of:
    selecting, in response to user input, the search string from the list of most recently used search strings;
    searching the database for answers responsive to the step of selecting the search string from the list of most recently used search strings;
    displaying a third list of potential answers responsive to the step of searching the database for answers responsive to the step of selecting the search string from the list of most recently used search strings;
    selecting, in response to user input, one of the potential answers responsive to the step of displaying a third list of potential answers; and
    displaying a help text responsive to selecting one of the potential answers responsive to the step of displaying a third list of potential answers.

4. A method for providing computer software help utility, comprising the steps of:
    providing a text entry area on a tool bar of a software application data entry and editing window;
    receiving a search string at the text entry area;
    searching a database for answers responsive to the search string;
    displaying a list of potential answers responsive to the search string;
    allowing a user to determine whether an acceptable answer is provided in the list of potential answers;
    if an acceptable answer is not provided in the list of potential answers, receiving a refined search string at the edit control, and searching the database for more answers responsive to the refined search string;
    displaying a second list of potential answers responsive to the refined search string;
    selecting, in response to user input, one of the potential answers from the second list of potential answers; and
    displaying a help text responsive to selecting one of the potential answers;
    after receiving the search string and the refined search string at the text entry area, storing the search string and the refined search string in a list of most recently used search strings;
    determining if the received search string or the refined search string is related to a search string stored in the list of most recently used search strings, and;
    if the received search string or the refined search string is related to a search string stored in the list of most recently used search strings, then:
        retrieving the list of most recently used search strings; and
        displaying the list of most recently used search strings.

5. The method of claim 4, further comprising the steps of:
    selecting, in response to user input, one of the search strings or the refined search strings from the list of most recently used search strings;

searching the database for answers responsive to the step of selecting one of the search string or the refined search string from the list of most recently used search strings;

displaying a third list of potential answers responsive to the step of searching the database for answers responsive to the step of selecting one of the search strings or the refined search string from the list of most recently used search strings;

selecting, in response to user input, one of the potential answers responsive to the step of displaying a third list of potential answers; and displaying a help text responsive to step of selecting one of the potential answers responsive to the step of displaying a third list of potential answers.

6. A computer readable medium having stored thereon computer-executable instructions which when executed by a computer, perform the steps of:

providing a text entry area on a tool bar of software application data entry and editing window;

receiving a search string at the text entry area;

searching a database for answers responsive to the search string;

displaying a list of potential answers responsive to the search string;

selecting, in response to user input, one of the potential answers responsive to the search string;

displaying a help text responsive to selecting one of the potential answers;

after receiving the search string at the text entry area, storing the search string in a list of most recently used search strings;

determining if the received search string is related to a search string stored in the list of most recently used search strings; and if the received search string is related to a search string stored in the list of most recently used search strings, then:

retrieving the list of most recently used search strings; and displaying the list of most recently used search strings.

7. The computer readable medium of claim 6 having stored thereon computer-executable instructions which when executed by a computer, after the step of displaying a list of potential answers responsive to the search string, further perform the steps of:

allowing the user to determine whether an acceptable answer is provided in the list of potential answers;

if an acceptable answer is not provided in the list of potential answers, refining in response to user input, the search string, and searching the database for more answers responsive to the refined search string;

displaying a second list of potential answers responsive to the refined search string; and wherein the step of selecting one of the potential answers responsive to the search string includes selecting one of the potential answers from the second list of potential answers.

8. The computer readable medium of claim 6 having stored thereon computer-executable instructions which when executed by a computer, further perform the steps of:

selecting, in response to user input, the search string from the list of most recently used search strings;

searching the database for answers responsive to the step of selecting the search string from the list of most recently used search strings;

displaying a third list of potential answers responsive to the step of searching the database for answers responsive to the step of selecting the search string from the list of most recently used search strings;

selecting, in response to user input, one of the potential answers responsive to the step of displaying a third list of potential answers; and displaying a help text responsive to step of selecting one of the potential answers responsive to the step of displaying a third list of potential answers.

9. A system for providing computer software help utility, comprising:

a software module operative to provide an edit control on the tool bar of a software application data entry and editing window;

to receive a search string at the edit control;

to search a database for answers responsive to the search string;

to display a list of potential answers responsive to the search string;

to allow a user to determine whether an acceptable answer is provided in the list of potential answers;

if an acceptable answer is not provided in the list of potential answers, to receive a refined search string at the edit control, and to search the database for more answers responsive to the refined search string;

to display a second list of potential answers responsive to the refined search string;

to allow a user to select one of the potential answers from the second list of potential answers; and to display a help text responsive to selecting one of the potential answers;

to store the search string and the refined search string in a list of most recently used search strings after receiving the search string and the refined search string at the text entry area;

to determine if the search string or the refined search string is related to a search string stored in the list of most recently used search strings; and if the search string or the refined search string is related to a search string stored in the list of most recently used search strings, then:

to retrieve the list of most recently used search strings; and to display the list of most recently used search strings.

10. The system of claim 9, the software module further operative:

to allow the user to select one of the search strings or the refined search strings from the list of most recently used search strings;

to search the database for answers responsive to the step of selecting one of the search string or the refined search string from the list of most recently used search strings;

to display a third list of potential answers responsive to the step of searching the database for answers responsive to the step of selecting one of the search strings or the refined search string from the list of most recently used search strings;

to allow the user to select one of the potential answers responsive to the step of displaying a third list of potential answers; and to display a help text responsive to step of selecting one of the potential answers responsive to the step of displaying a third list of potential answers.

* * * * *

UNITED STATES PATENT AND TRADEMARK OFFICE
CERTIFICATE OF CORRECTION

PATENT NO. : 6,983,271 B2
APPLICATION NO. : 09/880424
DATED : January 3, 2006
INVENTOR(S) : Catherine Rose Morrow et al.

It is certified that error appears in the above-identified patent and that said Letters Patent is hereby corrected as shown below:

On the Title Page Item (56), under "Other Publications" line 2, after "Wilson and" delete "b." and insert -- B. --, therefor.

In column 8, line 37, after "document?"" insert -- . --.

In column 9, line 51, in Claim 1, delete "strings" and insert -- string --, therefor.

In column 9, line 53, in Claim 1, after "strings;" delete "and".

In column 10, line 42, in Claim 4, delete "edit control" and insert -- text entry area --, therefor.

In column 10, line 47, in Claim 4, after "answers;" delete "and".

In column 10, line 57, in Claim 4, after "strings" delete ", and;" and insert -- ; and --, therefor.

In column 11, line 2, in Claim 5, delete "string" and insert -- strings --, therefor.

In column 11, line 3, in Claim 5, delete "string" and insert -- strings --, therefor.

In column 11, line 8, in Claim 5, delete "string" and insert -- strings --, therefor.

In column 11, line 19, in Claim 6, after "bar of" insert -- a --.

In column 12, line 12, in Claim 9, delete "an edit control" and insert -- a text entry area --, therefor.

In column 12, line 12, in Claim 9, delete "the" and insert -- a --, therefor.

In column 12, line 14, in Claim 9, delete "edit control" and insert -- text entry area --, therefor.

In column 12, line 23, in Claim 9, delete "edit control" and insert -- text entry area --, therefor.

In column 12, line 28, in Claim 9, after "answers;" delete "and".

UNITED STATES PATENT AND TRADEMARK OFFICE
CERTIFICATE OF CORRECTION

PATENT NO. : 6,983,271 B2
APPLICATION NO. : 09/880424
DATED : January 3, 2006
INVENTOR(S) : Catherine Rose Morrow et al.

It is certified that error appears in the above-identified patent and that said Letters Patent is hereby corrected as shown below:

In column 12, line 51, in Claim 10, delete "string" and insert -- strings --, therefor.

In column 12, line 52, in Claim 10, delete "string" and insert -- strings --, therefor.

In column 12, line 57, in Claim 10, delete "string" and insert -- strings --, therefor.

Signed and Sealed this

Twenty-second Day of September, 2009

David J. Kappos
*Director of the United States Patent and Trademark Office*